US008568669B2

(12) United States Patent
Huziwara et al.

(10) Patent No.: US 8,568,669 B2
(45) Date of Patent: Oct. 29, 2013

(54) DEVICE FOR COOLING AND DISTRIBUTING MIXED CHARGES ON FIXED CATALYST BEDS

(75) Inventors: Wilson Kenzo Huziwara, Rio de Janeiro (BR); Donizeti Aurelio Silva Belato, Rio de Janeiro (BR); Jorge Roberto Duncan Lima, Rio de Janeiro (BR); Rogério Michelan, Rio de Janeiro (BR); William Victor Carlos Candido, Rio de Janeiro (BR); Angelo Jose Gugelmin, Rio de Janeiro (BR); Paulo Sérgio Freire, Rio de Janeiro (BR); Nelson Patrício, Jr., Rio de Janeiro (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 43 days.

(21) Appl. No.: 12/916,177

(22) Filed: Oct. 29, 2010

(65) Prior Publication Data

US 2011/0104018 A1 May 5, 2011

(30) Foreign Application Priority Data

Oct. 30, 2009 (BR) ..................................... 0904285

(51) Int. Cl.
*B01J 8/04* (2006.01)
*B01J 8/00* (2006.01)
*B01J 8/02* (2006.01)
*B01J 35/02* (2006.01)
*B01J 19/00* (2006.01)
*B01D 47/00* (2006.01)
*B01D 47/06* (2006.01)

(52) U.S. Cl.
USPC ........... 422/648; 422/129; 422/198; 422/211; 422/220; 422/221; 422/600; 422/630; 422/644; 422/646; 261/19; 261/20; 261/21; 261/115; 261/116; 261/117; 261/118

(58) Field of Classification Search
USPC ......... 422/129, 198, 211, 220, 221, 600, 630, 422/644, 646, 648; 261/19–21, 75, 109, 261/113, 114.1–114.5, 115–118, 158–161
See application file for complete search history.

(56) References Cited

U.S. PATENT DOCUMENTS 2,061,830 A * 11/1936 Campbell ..................... 261/113
2,632,692 A 3/1953 Korin et al.
2,898,292 A 8/1959 Halik et al.

(Continued)

FOREIGN PATENT DOCUMENTS

CA 2 121 710 C 11/1994

*Primary Examiner* — Walter D Griffin
*Assistant Examiner* — Natasha Young
(74) *Attorney, Agent, or Firm* — Sughrue Mion, PLLC

(57) ABSTRACT

This invention relates to a device for cooling and distributing mixed charges on fixed catalyst beds for use in the cooling zone of descending flow reactors which comprises a flat tray fitted with collector and distributor tubes for liquid superimposed upon and connected to another flat tray of similar design to the upper tray. The device, which is of smaller size in comparison with other commercially available devices, is extremely simple to install industrially and compact, and has as its main characteristic the efficiency with which it promotes reduction of the temperature of the reaction medium when it receives the cooling fluid within the catalytic reactor.

4 Claims, 3 Drawing Sheets

(56) References Cited

U.S. PATENT DOCUMENTS

| | | | |
|---|---|---|---|
| 3,091,586 A * | 5/1963 | Maclaren et al. | 208/210 |
| 3,172,832 A | 3/1965 | Dreyer et al. | |
| 3,235,344 A | 2/1966 | Dreyer et al. | |
| 4,126,539 A * | 11/1978 | Derr et al. | 208/108 |
| 5,152,967 A | 10/1992 | Rossetti et al. | |
| 5,462,719 A | 10/1995 | Pedersen et al. | |
| 7,462,209 B2 * | 12/2008 | Berggren et al. | 48/197 R |
| 7,500,658 B2 * | 3/2009 | Boyer et al. | 261/96 |
| 2005/0013682 A1 | 1/2005 | Pedrini | |

\* cited by examiner

DEVICE FOR COOLING AND DISTRIBUTING MIXED CHARGES ON FIXED CATALYST BEDS

FIELD OF THE INVENTION

This invention relates to a device for cooling and distributing mixed charges on fixed catalyst beds for use in the cooling zone of descending flow reactors.

More specifically this invention relates to combined devices designed to act exclusively in the cooling zone of descending flow catalytic reactors, with the aim of cooling and redistributing the reaction mixture reaching the cooling zone of descending flow catalytic reactors.

BASIS OF THE INVENTION

Processes for the refining of oil, chemical processing and the production of organic compounds where reagents in different liquid and gaseous phases are pre-mixed and charged to vertical reactors to react together as they pass in a continuously descending flow through one or more layers of solid granular catalysts supported on permeable trays mounted in a vertical direction within the reactor, known as fixed catalyst beds, are well known.

Among the oil refining processes which use this technique there are the processes known as Hydrotreating, Hydrogenation, Dehydrogenation, Hydrocracking, and others. All are catalytic processes which require exothermic reactions and whose reagents are usually liquid or partly vapourised hydrocarbons and gaseous hydrogen.

In a typical Hydrocracking process, for example, a charge of liquid hydrocarbons of high molecular weight with an Initial Boiling Point (IBP) in the range 320° C. to 390° C. is premixed with gaseous hydrogen and then injected at the top of a vertical catalytic reactor, a typical configuration of which is illustrated diagrammatically in FIG. 1 accompanying this description.

The charge flows within the reactor in a descending flow and passes continuously through fixed catalyst beds, reacting with itself and giving rise to lighter hydrocarbons of molecular weights in the diesel range (IBP around 100° C.) or gasoline range (IBP around 30° C.), depending upon the degree of severity imposed on the process.

In order for these reactions to take place efficiently as the mixed charge passes through the fixed catalyst beds it is essential that:

firstly, the gas phase (hydrogen) remains well mixed with a liquid phase (hydrocarbons) to ensure that the design stoichiometric ratio of the reagents is maintained, secondly, that the charge is uniformly distributed over the surface of the fixed catalyst beds.

Uniform distribution of the charge avoids the appearance of "hot spots" on the fixed beds, which appear when the charge follows preferred paths within the beds, diverting from the parts of the catalyst present there and overcharging the other parts, which suffer more accelerated deactivation due to the formation of coke.

It is also necessary to control the excessive heat generated by these exothermic reactions. This control is applied in an intermediate zone of the reactor, between the upper and lower fixed catalyst beds, through the injection of a cooling fluid, generally a process gas, or a liquid, at a temperature lower than the interior of the reactor. As it mixes with the very hot reaction liquid this fluid reduces its temperature to more appropriate levels for satisfactory conduct of the process (see FIG. 1 mentioned above). This fluid promoting cooling may be a liquid, a light naphtha, in the gasoline range, for example, but it is generally a specific gaseous component of the reaction mixture passing through the reactor, precisely with the intention of replacing the part of the gaseous reagent lost in the previous beds of the catalyst and thus maintaining the gas/liquid ratio of the reagents constant throughout the entire pass through the reactor.

The specialist technical literature teaches the use of distribution devices to overcome the abovementioned mixing, cooling and distribution problems. When installed in the cooling zone of reactors, always below the injection systems for the cooling fluid (quench panels), and above the layer of catalyst on the fixed lower beds, these devices occupy the full transverse cross-section of the reactor and were initially simple perforated plates preventing the flow of charge from concentrating at a single point on the catalytic bed, distributing it radially over the surface of the plates and causing it to flow through different holes onto the surface of the catalytic bed. This amplification of the number of points at which the charge arrives at the catalytic beds improved the distribution of the charge over the bed, but did not greatly help to promote good mixing of the reagents, or effectively reduce temperature, which made it necessary to use very large flows of cooling fluids.

Today the majority of these devices basically comprise distribution trays installed in the same positions and in the same way as the old perforated plates, but instead of only having holes they have a great variety of configurations. Of these, the most widely used are trays drained by various small "dams", similar to chimneys, dams which in turn have a variety of shapes, but are in general tubular and provided with a cover containing lateral openings made to allow the gas to pass and prevent the direct passage of liquid, which is partly retained on the tray forming a level reservoir which continuously overflows over the tubular dams in a cascade, always in effective contact with the gas, promoting good mixing between the two phases and better distributing the charge over the surface of the catalytic beds.

Different types of mixed charge mixing and distribution devices on fixed catalyst beds can be found in the patent literature, such as those described in American patent documents U.S. Pat. No. 2,632,692, U.S. Pat. No. 2,898,292, U.S. Pat. No. 3,235,344, U.S. Pat. No. 3,172,832 and U.S. Pat. No. 5,462,719, for example. These devices may be regarded as being generic, because they are used both in zones where the reactions start (tops of reactors, before the first layers of fixed catalyst beds) and in the cooling zones of the same.

At the present time the specialist technical literature has already described some new types of conjugate devices, that is those which incorporate more than one component in their configurations and are specifically designed for use in the cooling zone of vertically descending flow reactors. These conjugate devices increase the overall efficiency of the process, because by promoting longer contact between the gas phase and a liquid phase retained on the trays they improve mixing between the reagents which are in different phases and much improve distribution of the mixed charge over the fixed catalyst beds, but they have not proved to be so effective as regards reducing temperature in the cooling zone and therefore an improvement of the technology is still necessary, specifically in the cooling zone.

RELATED ART

Among the conjugate devices especially designed to operate in the cooling zone of vertical descending flow reactors mention should be made of those described in American patent documents U.S. Pat. No. 5,152,967 and US 2005/0163682 and in Canadian patent document CA 2121710. The conjugate devices in the patents cited above typically comprise distribution trays coupled with other components where in general the trays function by retaining small sheets of liquid upon themselves, while other components of the device have mechanical directors which force the cooling gas to pass within the said sheets of liquid retained on the distribution trays. This passage through the sheet of liquid by the cooling gas, which is normally injected into the reactor under pressure, is designed to produce turbulence in the liquid layer, which by causing the latter to be strongly agitated improves mixing of the liquid reagents with the gaseous reagents bringing about a good reduction in the temperature of the liquid charge at the same time. In order to achieve an adequate distribution of mixed charge onto the fixed catalyst beds lying below the cooling zone the devices mentioned use various mechanical flow deflectors mounted on or on top of the distributor trays, or on other conjugate components.

This plurality of components makes the mechanical design of the said devices very complex, and as a consequence makes industrial installation painstaking and difficult. In addition to this these devices are very large and heavy, and therefore occupy a significant space in the reactors, which in order to contain them have to be larger and very much more expensive.

Another disadvantage concerning the use of complex devices of this type relates to the existence of small slots and mechanical obstacles incorporated in the trays to direct the flows of gases and liquids in a specific direction. These directing slots and baffles tend to become eroded and clog with greater ease, prematurely interrupting satisfactory operation of the device and requiring industrial units to be shut down for maintenance with greater frequency, mainly because of the fact that very high temperatures are used in these environments, in the presence of suspended solid particles and products having a high molecular weight which are difficult to handle.

The object of this invention is to eliminate all these problems by providing an innovative device for use in the cooling zone of descending flow catalytic reactors, of extremely simple and compact design which is easy to install, and of relatively small size, which has the effect of well mixing a cooling fluid with the reactor charge, homogeneously distributing this charge over the catalyst bed and, mainly, effectively reducing the temperature of the reactor, thus helping to improve the efficiency and conversion of reactors of this type, as will be demonstrated below.

SUMMARY OF THE INVENTION

This invention relates to a device for the cooling and distribution of mixed charges on fixed catalyst beds for use in the cooling zone of descending flow reactors, which comprises an upper flat tray located above and connected to a lower flat tray, these two components being attached to the internal walls of a reactor horizontally and in parallel, especially a reactor for the hydrotreating of hydrocarbons.

The upper flat tray is perforated and provided with tubes collecting and distributing mixtures of liquid and gas which are the connecting elements between the two components of the device, components which extend from a particular height above the upper flat tray and terminate below the lower flat tray at a specific distance above the lower fixed catalyst bed.

With regard to the location of the device in relation to the feed inlets for the cooling fluids, this first embodiment of this invention has two options:

a) an inlet to feed the liquid phase cooling fluid may be located above the upper flat tray of the device, and
b) an inlet for feeding the cooling fluid in the gas phase may be located between the conjugate components of the device, that is into the chamber formed between the upper flat tray and the lower flat tray.

The existence of these two inlets in the said arrangement is to be used when the reactor is designed to operate simultaneously with liquid and gaseous cooling fluids. When the reactor is designed to operate with only the injection of gaseous fluid it is sufficient to use the configuration identified above as "b". This embodiment does not permit operation of the reactor with the injection of only liquid cooling fluids.

This invention also allows for an alternative embodiment in which the upper flat tray can be located above another lower flat tray, the trays being attached to the internal walls of the reactor horizontally and in parallel, always below the feed inlet for the cooling fluid, which may be in the gaseous or liquid phase, or a mixture of both phases.

BRIEF DESCRIPTION OF THE DRAWINGS

The device for the cooling and distribution of mixed charges on fixed catalyst beds for use in the cooling zone of descending flow reactors to which this invention relates will now be duly explained by the following detailed description with reference to the drawings mentioned below which form an integral part of this description.

DETAILED DESCRIPTION OF THE INVENTION

With a view to provide a better understanding and evaluation of the invention the detailed description of the device for the cooling and distribution of mixed charges on fixed catalyst beds for use in the cooling zone of descending flow reactors to which this invention relates will be referenced to the Figures according to the identifications of its respective components.

Figure 1:
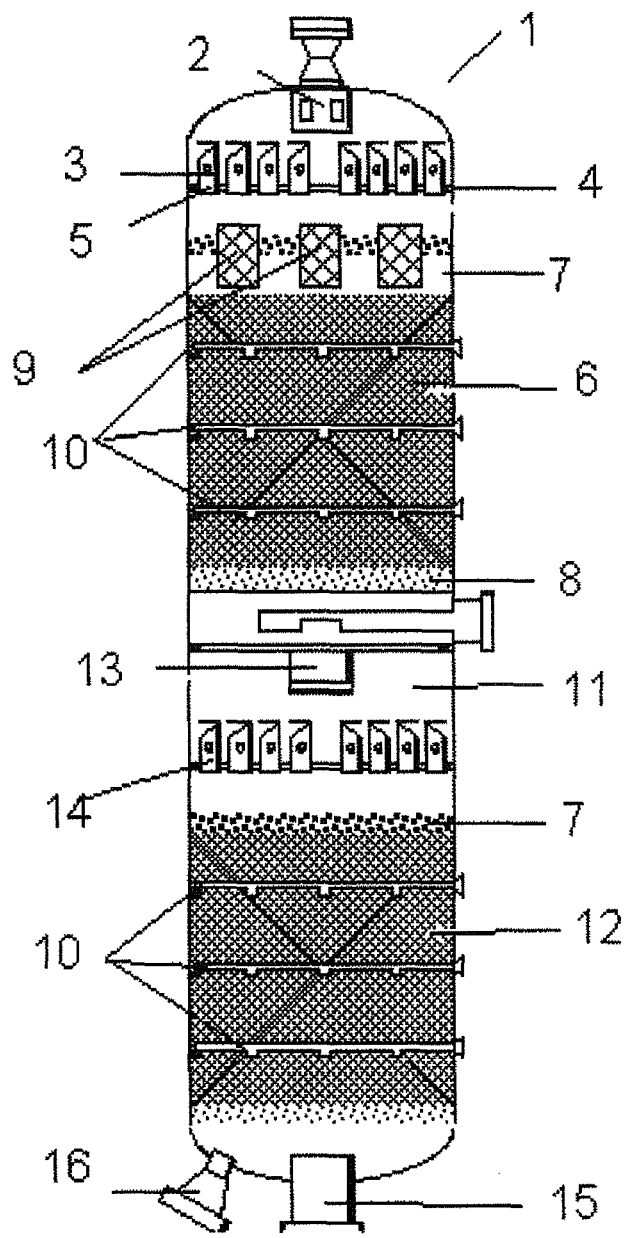
FIG. 1 shows a diagrammatical illustration of a typical descending flow reactor according to the state of the art, provided with fixed catalyst beds, known in the literature as a trickle-bed reactor.

FIG. 1 shows a diagrammatical view of a typical descending flow fixed catalyst bed reactor (1) in which a mixed charge containing a liquid (for example hydrocarbons of high molecular weight) and a gas (for example hydrogen) is premixed before being fed to the top of the reactor (1) through a central charging injector (2) and a mixed charge distribution device (3). The said central charge injector (2) sprays the mixture peripherally onto a flat tray (4) in the form of a disc, on which collector tubes (5) are fitted. The upper fixed catalyst bed (6) of granulated solids, placed between two layers of solid chemically-inert spherical pellets (7, 8) is located beneath flat charge distribution tray (4), and it is common for porous baskets (9), also filled with inert particulate ceramic material, to be inserted in first layer (7).

The purpose of these layers (7, 8) is to help uniformly distribute the charge over the catalyst bed, while the baskets (9) have the task of retaining any foreign particles which may have entered with the charge and might clog the catalyst bed.

Thermocouples (not shown in the figure) which measure the temperatures in the beds and which make it possible to control the exothermic reactions taking place there as the charge passes through are located in wells (10) placed within the catalyst bed.

Below this second layer (8) of solid pellets lies the chamber for "dampening down" the reaction, that is the "quench" chamber or cooling zone (11) which lies between two fixed upper and lower catalyst beds. As the reactions taking place in upper fixed catalyst bed (6) are highly exothermic, it is necessary to protect the catalyst in lower fixed bed (12) from the excessive heat generated above. Typically this cooling is brought about through the injection of a colder gas or liquid into the reactor through the "quench panel" (13), which in order to perform this task adequately has to promote optimum distribution of the gas both horizontally and radially throughout the transverse surface area of the reactor, immediately below the charge flowing from the upper fixed catalyst bed (6).

The mixture of gas and liquid is held back so as to cause the charge to pass through a second distribution device (14) similar to the first located immediately after the "quench panel" (13) and to flow through the same in order to reach the surface of the next fixed bed (12) as uniformly as in the first upper fixed catalyst bed (6). The final product is collected in the product collector (15) at the bottom of the reactor, as spent catalyst is also collected by the catalyst collector (16).

Figure 2:
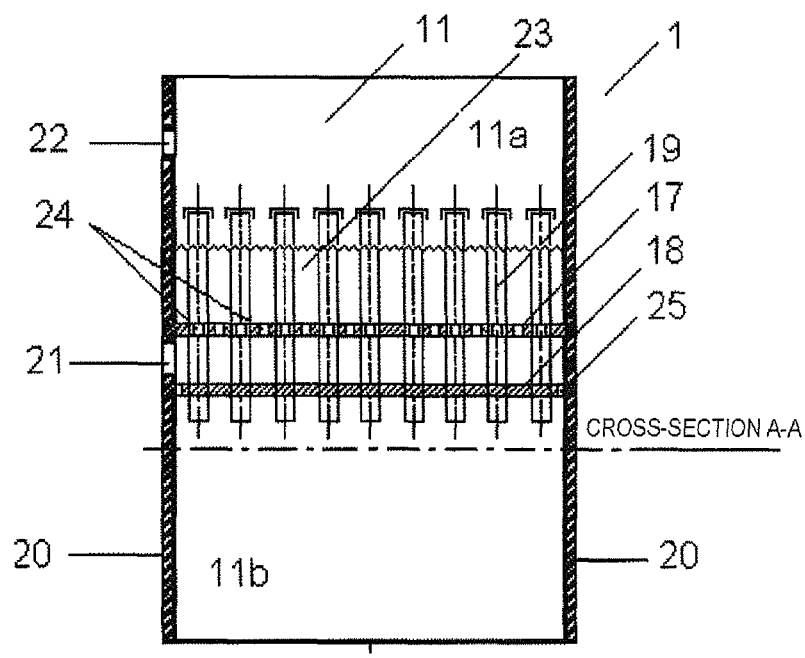
FIG. 2 shows a diagrammatical illustration of a first embodiment of this invention.

FIG. 2 shows a first embodiment of the device according to this invention which comprises an upper flat tray (17) located above and connected to a lower flat tray (18). Upper flat tray (17) is perforated and provided with collector tubes and distributors for mixtures of liquid and gas (19), these being the connecting members between the flat trays (17 and 18) of the device, these connecting elements extending from a given height above upper flat tray (17) and ending below lower flat tray (18) at a specific distance above the lower fixed catalyst bed (not shown in the figure). Flat trays (17 and 18) of the device are located within the reactor cooling zone (11) and are attached to the internal walls (20) of reactor (1) horizontally and in parallel.

The gaseous cooling fluid is fed through a first inlet (21) into the chamber formed by the space between upper flat tray (17) and lower flat tray (18), and then passes through the holes in upper tray (17) forming a mixture through direct contact with the sheet of liquid above the same.

When reactor (1) is designed to operate with two types of cooling fluids simultaneously, one of these being in the gas phase and the other in the liquid phase, both inlets (21 and 22) are used. The first inlet (21), located between upper tray (17) and lower tray (18), is used for gaseous cooling fluid and the second inlet (22) fitted above upper tray (17) is used for liquid phase cooling fluid, in this case it being necessary for it to be fitted with a spray in order to assist distribution of the liquid over upper tray (17).

Upper flat tray (17) is designed to hold a specific sheet of liquid (23) upon it and also has a set of holes (24) through which the ascending vapours of the gaseous cooling fluid pass. The main function of this sheet of liquid is to provide more effective contact between the vapours and the liquids circulating through reactor (1), and thus not only preserve the stoichiometric ratio of the gas and liquid mixture which will pass through the collector tubes and distributors but also ensure better efficiency in cooling the reaction mixture descending through the reactor. The device according to this invention well fulfils this cooling condition, being capable of reducing the radial temperature differences in the reaction mixture which flows through it to within the range from 1 to 2° C., whereas previous devices only enabled these reductions to be of the order of 10 to 20° C.

The dimensional relationship between the internal diameters of the collector and distributor tubes (19) for the gas and liquid mixture, the diameters of the holes (24) in the upper tray and the area of upper flat tray (17), together with the shape, quantity and arrangement of these said accessories on the tray do not form part of this invention and can be selected on the basis of a group of distribution trays, whose design includes at least such collector and distributor tubes for the gas and liquid mixture.

The chamber formed by the space between upper tray (17) and lower tray (18) has the function of promoting mixing of the gaseous cooling fluid with the liquid charge in the sheet of liquid above upper tray (17) and also with the liquid phase cooling fluid in the case where the operation takes place using two cooling fluids. The arrangement, diameters and quantities of holes (24) in upper tray (17) must comply with a design ratio which matches the design of upper flat tray (17), and the holes (25) for draining liquid from lower tray (18) have to have a total perforated area of the order of ⅛th to ¹⁄₂₀th of the total area of the holes (24) present in upper flat tray (17) in order to avoid the unnecessary accumulation of liquid on lower tray (18).

For the device according to this invention to have optimised performance it has been found necessary that upper flat tray (17) should have a sheet of liquid of a depth of the order of 5 to 10 cm upon it. In order for this liquid seal to be provided, the design of the device must take into account a pressure difference within the range from 3 to 7 kPa between the upper cooling zones (11a) and the lower cooling zone (11b) of the device. Or, more specifically, between the zone within the device bounded by upper flat tray (17) and lower tray (18) and the upper zone of the device (11a), the pressure difference at the level of sheet of liquid (23) on upper flat tray (17) must remain within the range from 2 to 4 kPa and in addition to this within the interior zone of the device and the lower cooling zone (11b) of the device the pressure difference measured in the distributor collector tubes (19) should remain within the range from 1 to 3 kPa.

Figure 3:
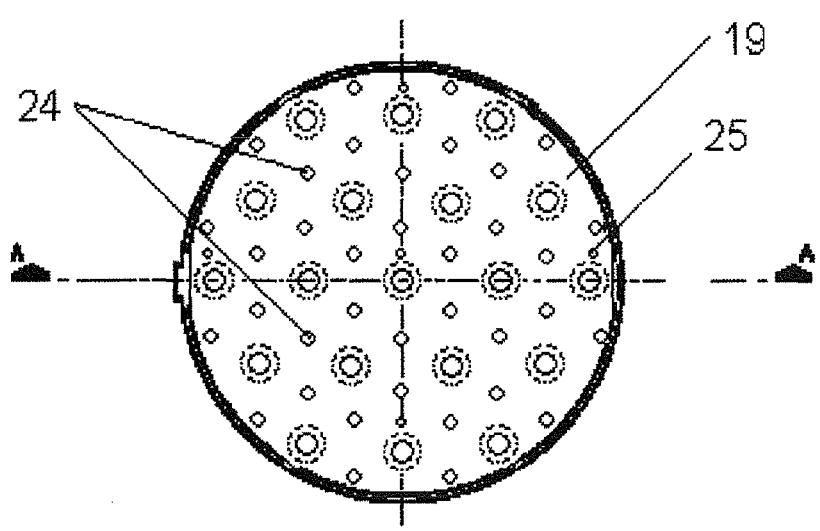
FIG. 3 shows a cross-sectional view of the embodiment of this invention illustrated in FIG. 2 along the cross-section A-A.

In order that the invention may be better visualised FIG. 3 shows a cross-sectional view of the first embodiment shown in FIG. 2 along cross-section A-A.

This invention also allows for an alternative embodiment in which upper flat tray (17) may be located above a second lower flat tray (26), these trays being attached to the inside walls (20) of reactor (1) horizontally and in parallel, always below the feed inlet (22) for cooling fluid in the following configuration:

a) upper flat tray (17) has various collector and distributor tubes (19) for the mixture of gas and liquid, which pass through the said upper flat tray (17) to which they are welded and extend in length over a specific distance above the said upper flat tray (17) and end at a specific height above the lower flat tray, b) a second lower flat tray (26) also has various collector and distributor tubes (30) for the gas and liquid mixture which are welded and pass through said lower flat tray (26) and extend in length over a specific distance below upper flat tray (17) and end below lower flat tray (26) at a specified distance from the lower fixed catalyst bed, c) the collector and distributor tubes (19 and 30) for the gas and liquid mixture on the two trays are installed in a staggered arrangement.

Figure 4:
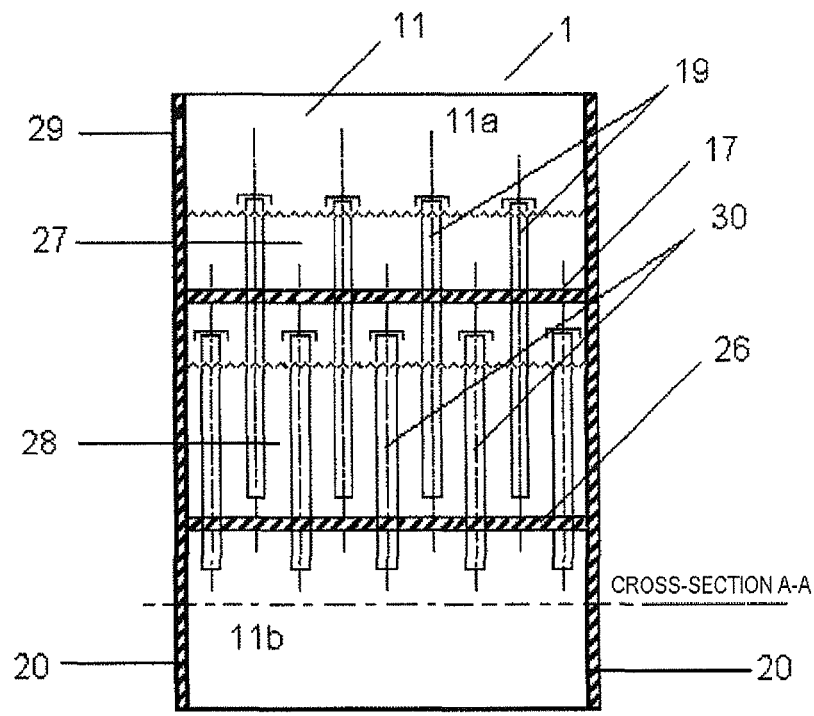
FIG. 4 shows a diagrammatical illustration of a second possible embodiment of the device according to this invention.

FIG. 4 shows this second possible embodiment of the device according to this invention, in which the said device also comprises an upper flat tray (17), but the said tray is now located some distance above a second lower flat tray (26) of similar design to upper flat tray (17). In this embodiment of the device the flat trays (17 and 26) are also designed in such a way that both the trays have the ability to hold sheets of liquid (27 and 28) above them of sufficient depth not only to promote effective cooling of the reaction mixture in reactor (1) but also suitable contact between that reaction mixture and the cooling liquid or gas which enters cooling zone (11) of reactor (1).

In this second embodiment of the device the feed inlet (29) for liquid or gaseous fluids is always located above the set of flat trays (17 and 26) in the device according to this invention.

Upper flat tray (17) has various collector and distributor tubes (19) for the gas and liquid mixture welded thereto, the lower ends of which being immersed in the sheet of liquid (28) which accumulates above lower flat tray (26), which in turn also has collector and distributor tubes (30) for the gas and liquid mixture welded thereto, the upper edges of which are at a specific distance below upper flat tray (17) and whose lower ends are at a specific distance above the surface of the lower fixed catalyst bed, which is not shown in the Figure.

The said collector and distributor tubes (19 and 30) are arranged in a staggered way so that the tubes (30) on lower flat tray (26) are not in line with tubes (19) on upper flat tray (17), because this configuration would not permit adequate movement of the reaction mixture and cooling fluids passing through the device. The terminations of collector and distributor tubes (19) have to discharge the liquid overflowing from upper flat tray (17) directly onto the surface of lower flat tray (26) and not onto the other tubes on lower flat tray (26). In this second embodiment the movement of the liquids makes it necessary for the reagent gases and liquids to contact each other twice, thus making the temperature reduction for which the device is intended even more effective.

Likewise it is necessary to ensure that the bottom ends of the collector and distributor tubes (19) on upper flat tray (17) are immersed to a distance of between 20 mm and 40 mm below the surface of sheet of liquid (28) retained on lower flat tray (26).

In the same way as for the previous embodiment, in order that the device according to this invention should function adequately it is necessary that both the flat trays (17 and 26) hold sheets of liquid 5 to 10 cm deep upon them and that in order for this liquid seal to be produced the design of the device must consider the pressure differences between the abovementioned cooling zones. That is the design of the device must consider a pressure difference between the upper cooling zones (IIa) and the lower cooling zone (11b) of the device within the range from 3 to 7 kPa. Or, more specifically, between the interior zone of the device bounded by the upper flat tray (17) and the lower flat tray (26) and the upper cooling zone (11a) of the device, the pressure difference at the level of the sheet of liquid (23) on upper flat tray (17) must remain within the range from 2 to 4 kPa, and at the same time the pressure difference between the interior zone of the device as a whole (17 and 26) and the lower cooling zone (11b) of the device measured at the collector distributor tubes (19) must be kept within the range from 1 to 3 kPa.

For better functioning of the device according to this invention the cooling fluid, when in the liquid state, must be injected thorough liquid sprays (not shown in the figures), these being an application already well known to those skilled in the art.

Figure 5:
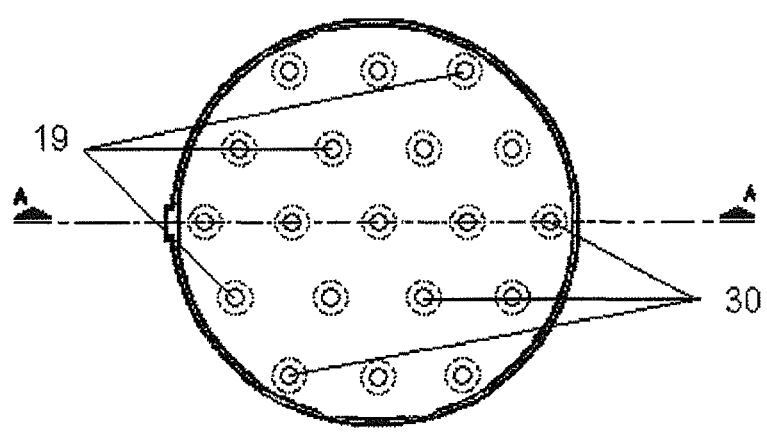
FIG. 5 shows a cross-sectional view of the embodiment of this invention illustrated in FIG. 4 along the cross-section A-A.

In order that that the invention may be better visualised FIG. 5 shows a cross-sectional view of the second embodiment of the invention illustrated in FIG. 4 along the cross-section A-A.

As regards determination of the distances separating the flat trays (17 and 18, or 17 and 26) in the two types of devices according to this invention, as well as the ends of the collector and distributor tubes (19 and 30) on the lower fixed catalyst beds, these can only be established on the basis of calculations performed on the basis of the reactor design data, such calculations being well within the scope of those skilled in the art, for which reason they have not been described as they do not form part of this description.

The invention claimed is:

1. A device for the cooling and distribution of mixed charges on fixed catalyst beds, comprising an upper flat tray (17) located above and connected to a lower flat tray (18), the upper flat tray (17) and lower flat tray (18) being perforated and fitted with collector and distributor tubes for mixtures of liquid and gas (19), these being the connecting members between the said flat trays (17 and 18) of the device, these elements extending from a specific height above the upper flat tray (17) and ending below the lower flat tray (18) at a specific distance above the lower fixed catalyst bed,
    wherein a first delivery inlet for cooling fluid (21) lies within the device between the upper flat tray (17) and the lower flat tray (18), and a second feed inlet (22) for cooling fluid is located above the flat trays (17 and 18).

2. The device for cooling and distribution of mixed charges on fixed catalyst beds according to claim 1, wherein
    only one inlet for cooling fluid (21) is located within the device, between the upper flat tray (17) and lower flat tray (18).

3. The device for cooling and distribution of mixed charges on fixed catalyst beds according to claim 1, wherein the holes (25) for draining liquid from the lower flat tray (18) have a total perforated area of the order of ⅛th to 1/20th of the total area of the holes (24) present in the upper flat tray (17).

4. The device for cooling and distribution of mixed charges on fixed catalyst beds according to claim 1,
    wherein the upper flat tray (17) has a sheet of liquid (23) of a depth of 5 to 10 cm upon it, the sheet of liquid (23) provides a liquid seal as a first pressure difference within the range from 2 to 4 kPa is applied between an interior zone within the device bounded by the upper flat tray (17) and the lower flat tray (18) and an upper cooling zone (11a); and a second pressure difference within 1 to 3 kPa is applied between the interior zone and a lower cooler zone (11b).

* * * * *